(12) United States Patent
Ihara

(10) Patent No.: US 7,745,059 B2
(45) Date of Patent: Jun. 29, 2010

(54) FUEL CELLS CARTRIDGE AND ELECTRIC APPARATUS HAVING BUILT-IN FUEL CELL

(75) Inventor: Shoji Ihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1611 days.

(21) Appl. No.: 10/998,640

(22) Filed: Nov. 30, 2004

(65) Prior Publication Data

US 2005/0123818 A1    Jun. 9, 2005

(30) Foreign Application Priority Data

Dec. 4, 2003    (JP) ............................. 2003-406165

(51) Int. Cl.
*H01M 8/04* (2006.01)
*H01M 8/10* (2006.01)

(52) U.S. Cl. .................. 429/456; 429/512; 429/400

(58) Field of Classification Search .................. None
See application file for complete search history.

(56) References Cited

U.S. PATENT DOCUMENTS 6,057,051 A    5/2000 Uchida et al. ................. 429/19

| | | | |
|---|---|---|---|
| 7,416,805 B2 * | 8/2008 | Nakamura et al. ............ 429/34 |
| 2002/0026594 A1 | 2/2002 | Hayashi et al. .............. 713/300 |
| 2005/0023236 A1 * | 2/2005 | Adams et al. ................ 251/366 |

FOREIGN PATENT DOCUMENTS

| JP | 9-213359 | | 8/1997 |
|---|---|---|---|
| JP | 09-213359 | * | 8/1997 |
| JP | 2002-32154 | | 1/2002 |

* cited by examiner

*Primary Examiner*—Dah-Wei Yuan
*Assistant Examiner*—Angela J. Martin
(74) *Attorney, Agent, or Firm*—Fitzpatrick, Cella, Harper & Scinto

(57) ABSTRACT

The fuel cell cartridge including: an external casing; a fuel cell body (stack), which is accommodated in the external casing and which includes at least a fuel electrode, an oxidizer electrode, and an ion conductor; and a fuel tank for storing a fuel, wherein the external casing has a penetration hole, which penetrates an inner portion of the external casing and which is in communication with outside air, and wherein an inner wall of the penetration hole is provided with at least an opening communicating with the oxidizer electrode. The fuel cell cartridge is detachably attached to an electric apparatus, and an inlet of the penetration hole of the fuel cell cartridge is situated at a position corresponding to an outside-air communicating port, which is provided in the electric apparatus and which is in communication with outside air.

4 Claims, 8 Drawing Sheets

FUEL CELLS CARTRIDGE AND ELECTRIC APPARATUS HAVING BUILT-IN FUEL CELL

BACKGROUND OF THE INVENTION

1. Field of the Invention

The present invention relates to a fuel cell cartridge, an electric apparatus using the same, and an electric apparatus having a built-in fuel cell.

2. Related Background Art

A fuel cell converts chemical energy, which is obtained by chemically reacting a fuel, such as hydrogen or methanol, with oxygen, directly into electric energy. Thus, high electric power generation efficiency can be attained from the fuel cell. Since a small number of mechanical drive portions are provided in the fuel cell, noise generated therein is extremely small. Also, the fuel cell can be miniaturized.

As a small-sized fuel cell, there is exemplified a polymer electrolyte fuel cell. The polymer electrolyte fuel cell is devised for use in an electric power source for a portable device like a laptop personal computer or a mobile phone. The polymer electrolyte fuel cell is used as a substitute for a primary battery such as an alkaline battery or a secondary battery such as a nickel ion battery; the polymer electrolyte fuel cell can be installed in an electric apparatus for use.

For example, regarding the use of a fuel cell in an electric apparatus, it is disclosed in Japanese Patent Application Laid-Open No. 2002-032154 that a fuel cell is used for an electric power source for a laptop personal computer or the like. The fuel cell is externally attached to the laptop personal computer to prevent water generated in a fuel cell body due to an electric power generating reaction from seeping into the laptop personal computer.

In addition, Japanese Patent Application Laid-Open No. H9-213359 discloses a laptop personal computer having a built-in fuel cell.

Incidentally, the fuel cell differs from the primary battery or the secondary battery in that electricity is generated through a chemical reaction between hydrogen, methanol, or the like, functioning as a fuel, and oxygen (hereinafter, referred to as "electric power generating reaction"). When the fuel cell is attached to the electric apparatus, attention should be paid to that oxygen necessary for the electric power generating reaction is efficiently supplied to the fuel cell body, precise handling is conducted so that moisture and heat resulting from the electric power generating reaction do not adversely affect the electric apparatus, and so forth.

According to a structure disclosed in Japanese Patent Application Laid-Open No. 2002-032154, the laptop personal computer and the fuel cell are not integrated but separated from each other. Therefore, moisture and heat resulting from the electric power generating reaction do not adversely affect the laptop personal computer that is an electric apparatus, but portability is poor.

In Japanese Patent Application Laid-Open No. H9-213359, the laptop personal computer is adapted to have a built-in fuel cell, so portability is acceptable; it is however necessary to supply oxygen necessary for the electric power generating reaction to the fuel cell body with improved efficiency and conduct precise handling so that the moisture and heat resulting from the electric power generating reaction do not adversely affect the electric apparatus.

SUMMARY OF THE INVENTION

In light of the above-mentioned problems, it is therefore an object of the present invention to provide a fuel cell cartridge capable of supplying oxygen necessary for an electric power generating reaction to a fuel cell body with improved efficiency, and an electric apparatus having a built-in fuel cell.

Further, it is another object of the present invention is to provide a fuel cell cartridge capable of conducting precise handling so that moisture and heat resulting from an electric power generating reaction do not adversely affect an electric apparatus of using the fuel cell, and an electric apparatus having a built-in fuel cell.

According to a first aspect of the present invention, there is provided an electric apparatus including: an external casing; and a fuel cell body which is accommodated in the external casing and which includes at least a fuel electrode, an oxidizer electrode, and an ion conductor, wherein the external casing has a penetration hole which penetrates an inner portion of the external casing and which is in communication with outside air, and wherein an inner wall of the penetration hole is provided with at least an opening communicating with the oxidizer electrode.

It is preferable that the above-described electric apparatus further includes a fuel tank for storing a fuel to be supplied to the fuel electrode.

It is preferable that the above-described fuel tank is detachably attached to the electric apparatus.

According to a second aspect of the present invention, there is provided a fuel cell cartridge including: an external casing; a fuel cell body which is accommodated in the external casing and which includes at least a fuel electrode, an oxidizer electrode, and an ion conductor; and a fuel tank storing a fuel, wherein the external casing has a penetration hole which penetrates an inner portion of the external casing and which is in communication with outside air, and wherein an inner wall of the penetration hole is provided with at least an opening communicating with the oxidizer electrode.

It is preferable that the above-described fuel cell cartridge is detachably attached to the electric apparatus, and an inlet of the penetration hole of the fuel cell cartridge is situated at a position corresponding to an outside-air communicating port which is provided in the electric apparatus and which is in communication with outside air.

It is preferable that the above-described oxidizer electrode is disposed along the penetration hole while facing the opening provided in the inner wall of the penetration hole of the external casing.

According to a third aspect of the present invention, there is provided an electric apparatus using any one of the above-described fuel cell cartridges to be mounted therein, further including a fuel cell cartridge container for accommodating the fuel cell cartridge, the fuel cell cartridge container has an outside-air communicating port communicating with outside air, and wherein the outside-air communicating port is situated at a position corresponding to the penetration hole provided in the external casing of the fuel cell cartridge.

According to a fourth aspect of the present invention, there is provided an electric apparatus including:

a fuel cell cartridge detachably attached to the electric apparatus, the fuel cell cartridge including: an external casing; a fuel cell body which is accommodated in the external casing and which includes at least a fuel electrode, an oxidizer electrode, and an ion conductor; and a fuel tank for storing a fuel, wherein the external casing has a penetration hole which penetrates an inner portion of the external casing and which is in communication with outside air, and wherein an inner wall of the penetration hole is provided with at least an opening communicating with the oxidizer electrode; and a fuel cell cartridge container for accommodating the fuel cell cartridge, the container having an outside-air communicating port in communication with outside air, wherein the outside-air communicating port is situated at a position corresponding to the penetration hole provided in the external casing of the fuel cell cartridge.

According to a fifth aspect of the present invention, there is provided an electric apparatus including: an external casing; and a fuel cell body which is accommodated in the external casing and which includes at least a fuel electrode, an oxidizer electrode, and an ion conductor, wherein the external casing has a concave portion communicating with outside air, and wherein an inner wall of the concave portion is provided with at least an opening communicating with the oxidizer electrode.

According to a sixth aspect of the present invention, there is provided a fuel cell cartridge including: an external casing; a fuel cell body which is accommodated in the external casing and which includes at least a fuel electrode, an oxidizer electrode, and an ion conductor; and a fuel tank storing a fuel, wherein the external casing has a concave portion communicating with outside air, and wherein an inner wall of the concave portion is provided with at least an opening communicating with the oxidizer electrode.

It is preferable that the above-described fuel cell cartridge is detachably attached to an electric apparatus, and an inlet of the concave portion of the fuel cell cartridge is situated at a position corresponding to an outside-air communicating port which is provided in the electric apparatus and which is in communication with outside air.

According to a seventh aspect of the present invention, there is provided an electric apparatus including:

a fuel cell cartridge detachably attached to the electric apparatus, the fuel cell cartridge including: an external casing; a fuel cell body which is accommodated in the external casing and which includes at least a fuel electrode, an oxidizer electrode, and an ion conductor; and a fuel tank for storing a fuel, wherein the external casing has a concave portion communicating with outside air, and wherein an inner wall surface of the concave portion is provided with at least an opening communicating with the oxidizer electrode; and a fuel cell cartridge container for accommodating the fuel cell cartridge, the container having an outside-air communicating port in communication with outside air, wherein the outside-air communicating port is situated at a position corresponding to the concave portion provided in the external casing portion of the fuel cell cartridge.

According to the present invention, there can be provided a fuel cell cartridge capable of supplying oxygen necessary for an electric power generating reaction to a fuel cell body with improved efficiency, and an electric apparatus having a built-in fuel cell.

Further, according to the present invention, there can be provided a fuel cell cartridge capable of conducting precise handling so that moisture and heat resulting from an electric power generating reaction do not adversely affect an electric apparatus using the fuel cell, and an electric apparatus having a built-in fuel cell.

Other features and advantages of the present invention will be apparent from the following description taken in conjunction with the accompanying drawings.

DESCRIPTION OF THE PREFERRED EMBODIMENTS

Figure 1:
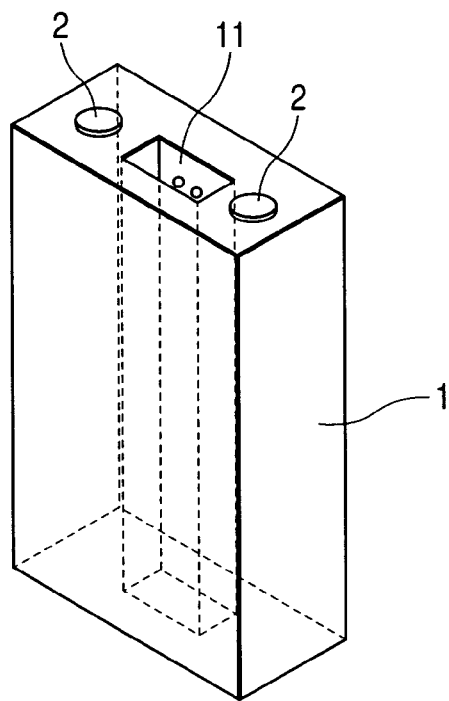
FIG. 1 is a perspective view of a fuel cell cartridge according to Example 1 of the present invention.

Hereinafter, a description will be given to the present invention in detail.

The first electric apparatus according to the present invention is an electric apparatus having a built-in fuel cell, including: an external casing; and a fuel cell part which is accommodated in the external casing, which performs a chemical reaction for electric power generation, and which is composed of a fuel electrode, an oxidizer electrode, and an ion conductor, wherein the external casing has a penetration hole which penetrates the external casing from its one end to the other end and which is in communication with outside air, wherein an inner wall of the penetration hole is provided with an opening, and wherein the fuel cell part is disposed along the penetration hole with the oxidizer electrode facing the opening.

Further, the first fuel cell cartridge according to the present invention is a fuel cell cartridge detachably attached to an electric apparatus, including: an external casing; a fuel cell part which is accommodated in the external casing, which performs a chemical reaction, and which is composed of a fuel electrode, an oxidizer electrode, and an ion conductor; and a fuel tank for storing a fuel for electric power generation, wherein the external casing has a penetration hole which penetrates the external casing from its one end to the other end and which is in communication with outside air, wherein an inner wall surface of the penetration hole is provided with an opening communicating with the oxidizer electrode, and wherein an inlet of the penetration hole is situated at a position corresponding to an outside-air communicating port which is formed in a fuel cell cartridge container of the electric apparatus using the fuel cell cartridge and which is in communication with outside air.

Further, the second electric apparatus according to the present invention is an electric apparatus including:

a fuel cell cartridge detachably attached to the electric apparatus, the fuel cell cartridge including: an external casing; a fuel cell part which is accommodated in the external casing, which performs a chemical reaction for electric power generation, and which is composed of a fuel electrode, an oxidizer electrode, and an ion conductor; and a fuel tank portion for storing a fuel for electric power generation, wherein the external casing has a penetration hole which penetrates the external casing from its one end to the other end and which is in communication with outside air, wherein an inner wall surface of the penetration hole is provided with an opening communicating with the oxidizer electrode; and a fuel cell cartridge container having an outside-air communicating port which is formed at the one end and the other end of the external casing and which are in communication with outside air, and wherein an inlet of the penetration hole of the fuel cell cartridge and the outside-air communicating port of the electric apparatus are positioned corresponding to each other.

Further, the second fuel cell cartridge according to the present invention is a fuel cell cartridge detachably attached to an electric apparatus, including: an external casing; a fuel cell part which is accommodated in the external casing, which performs a chemical reaction for electric power generation, and which is composed of a fuel electrode, an oxidizer electrode, and an ion conductor; and a fuel tank portion for storing a fuel for electric power generation, wherein the external casing has a concave portion extending from its one end to the other end, wherein the concave portion has an opening communicating with the oxidizer electrode, and wherein the fuel cell part is disposed with the oxidizer electrode facing the opening.

Further, the third fuel cell cartridge according to the present invention is a fuel cell cartridge detachably attached to an electric apparatus, the fuel cell cartridge including: an external casing; a fuel cell part which is accommodated in the external casing, which performs a chemical reaction for electric power generation, and which is composed of a fuel electrode, an oxidizer electrode, and an ion conductor; and a fuel tank portion for storing a fuel for electric power generation, wherein the external casing has a concave portion extending from its one end to the other end, wherein the concave portion has an opening communicating with the oxidizer electrode, and wherein the concave portion extending one end to the other end of the external casing is situated at a position corresponding to an outside-air communicating port which is formed in a fuel cell cartridge container of the electric apparatus using the fuel cell cartridge and which is in communication with outside air.

Furthermore, the third electric apparatus according to the present invention is an electric apparatus including:

a fuel cell cartridge detachably attached to the electric apparatus, the fuel cell cartridge including: an external casing; a fuel cell part which is accommodated in the external casing, which performs a chemical reaction for electric power generation, and which is composed of a fuel electrode, an oxidizer electrode, and an ion conductor; and a fuel tank portion for storing a fuel for electric power generation, wherein the external casing has a concave portion extending from its one end to the other end, wherein the concave portion has an opening communicating with the oxidizer electrode; and a fuel cell cartridge container provided with an outside-air communicating port in communication with outside air, wherein the concave portion extending from one end to the other end of the external casing and the outside-air communicating port of the fuel cell cartridge container is positioned corresponding to each other, and wherein the concave portion of the external casing and the outside-air communicating port of the fuel cartridge container form a penetration hole communicating with outside air.

Example 1

FIG. 1 is a perspective view schematically showing an external appearance of a fuel cell cartridge according to Example 1 of the present invention. In FIG. 1, reference numeral 1 denotes an external casing of the fuel cell cartridge, which accommodates a fuel tank and a fuel cell body (fuel cell part) for performing an electric power generating reaction. As shown in FIG. 1, the external casing has a penetration hole 11 penetrating an inner portion of the fuel cell cartridge from an upper surface to a lower surface thereof. Reference numeral 2 denotes an electrode for taking out electricity. When the fuel cell cartridge is attached to an electric apparatus, electricity is taken out using the two electrodes. In this example, a case is described where hydrogen is used as the fuel for the fuel cell.

Figure 2:
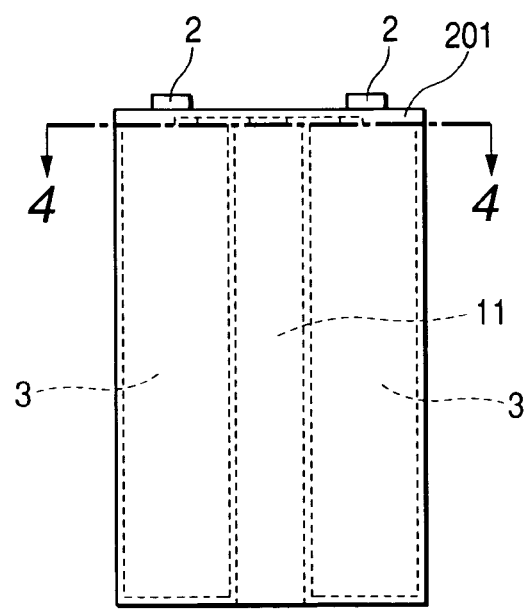
FIG. 2 is a front view of the fuel cell cartridge according to Example 1 of the present invention.
Figure 3:
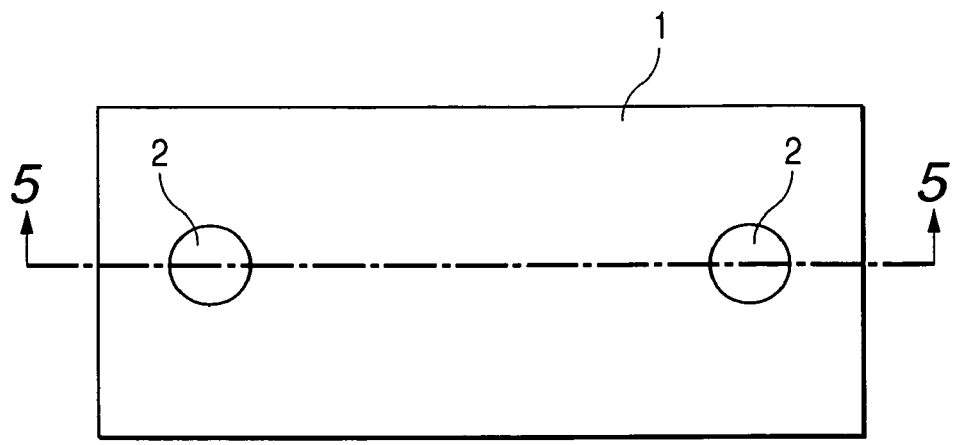
FIG. 3 is a plan view of the fuel cell cartridge according to Example 1 of the present invention.

FIG. 2 is a front view of the fuel cell cartridge shown in FIG. 1, and FIG. 3 is a plan view thereof. In FIG. 2, reference numeral 3 denotes a fuel tank. As shown in FIG. 2, two of the tanks 3 are provided on both sides of the penetration hole 11. Hydrogen serving as the fuel is stored in the fuel tanks. A hydrogen storage alloy is exemplified as means for storing hydrogen. The hydrogen storage alloy may be filled in the fuel tanks. Reference numeral 201 denotes a connection part in which attaching means 4 and a channel 5 are accommodated as will be described below. The penetration hole 11 penetrates the mounting means as well.

Figure 4:
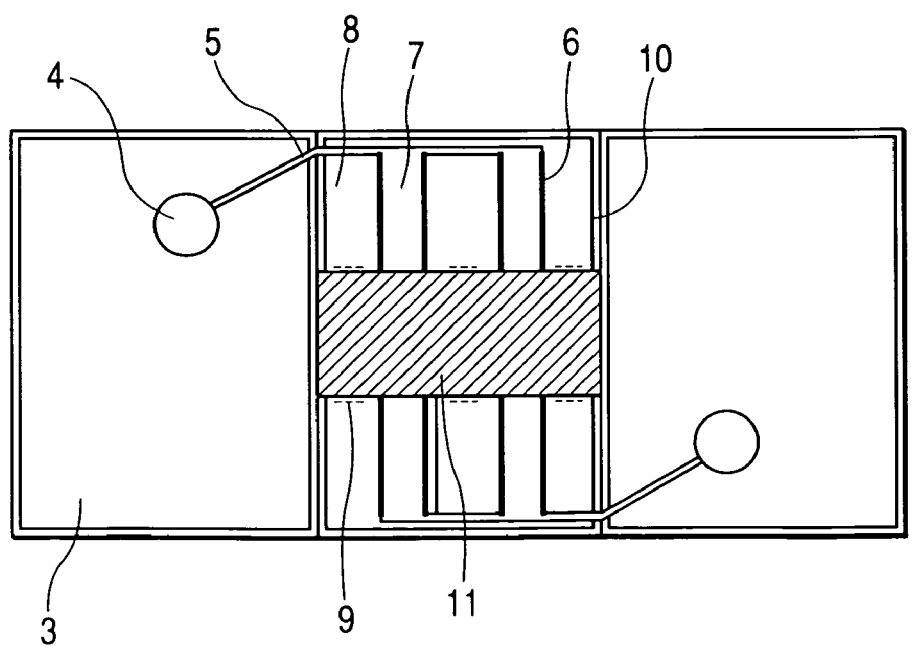
FIG. 4 is a cross sectional view, taken in the line 4-4 of FIG. 2, of the fuel cell cartridge according to Example 1 of the present invention.

FIG. 4 is a cross sectional view, taken in the line 4-4 of FIG. 2, of the fuel cell cartridge. In FIG. 4, reference numeral 4 denotes attaching means provided to the fuel tank for attaching the fuel tank to the fuel cell cartridge. A regulator for reducing the pressure of hydrogen gas stored in the respective fuel tanks at a high pressure to a predetermined pressure and a valve for controlling the flow of the hydrogen gas are incorporated in the attaching means. Reference numeral 5 denotes a channel through which the hydrogen gas flows, whereas reference numeral 10 denotes a fuel cell body (fuel cell part) for performing an electric power generating reaction. The fuel cell body (fuel cell part 10) is composed of fuel electrodes 7, oxidizer electrodes 8, and ion conductors (membrane electrode assemblies (MEAs) each including an electrode and a polymer electrolyte membrane 6). Reference numeral 11 denotes the penetration hole penetrating in a straight line manner from the upper surface to the lower surface of the fuel cell cartridge as shown in FIG. 1. Openings 9 are provided on the inner wall surface of the penetration hole corresponding to the oxidizer electrodes 8 of the fuel cell part. The electrodes taken from the respective MEAs are connected in series or in another suitable manner.

With respect to four MEAs in the upper portion and four MEAs in the lower portion of FIG. 4, although not shown in FIG. 4, the electrodes taken out from the MEAs in the upper portion are connected in series with an upper wiring and the electrodes taken out from the MEAs in the lower portion are connected in series with a lower wiring, the upper wiring and the lower wiring are connected in parallel and then connected to the electrodes 2.

Figure 5:
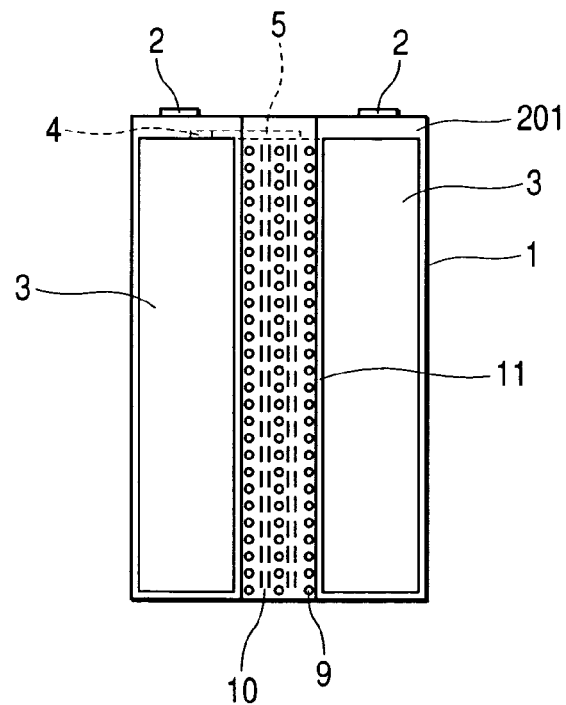
FIG. 5 is a cross sectional view, taken in the line 5-5 of FIG. 3, of the fuel cell cartridge according to Example 1 of the present invention.

FIG. 5 is a cross sectional view, taken in the line 5-5 of FIG. 3, of the fuel cell cartridge, which shows the components shown in FIG. 4.

Figure 6:
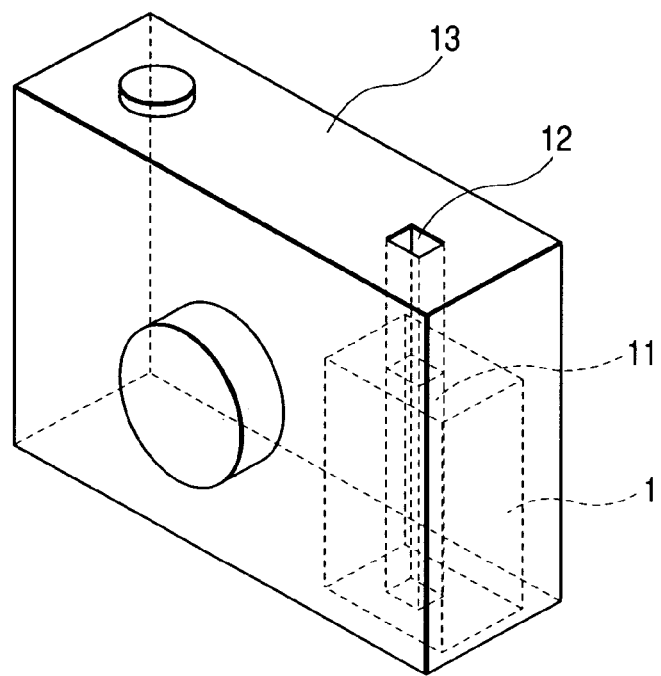
FIG. 6 is a view for explaining the state of the fuel cell cartridge according to Example 1 of the present invention being attached to an electric apparatus.

FIG. 6 is an explanatory view when the fuel cell cartridge according to this example is attached to an electric apparatus. FIG. 6 shows an example where the fuel cell cartridge is attached to a digital camera 13 functioning as the electric apparatus. In FIG. 6, reference numeral 12 denotes an opening provided in the digital camera, the opening being in communication with the penetration hole 11 of the external casing 1 of the fuel cell cartridge. An outside-air communicating port 12 is opened in a straight line manner, and this opening and the penetration hole 11 of the external casing 1 of the fuel cell cartridge are communicated with each other, whereby outside air effectively circulates from the outside-air communicating port 12 to the penetration hole 11.

Next, operation of the fuel cell according to this example will be described.

As shown in FIGS. 4 and 5, after the pressure of the hydrogen gas stored in the fuel tank 3 at a high pressure is reduced to a predetermined pressure by the attaching means 4, the hydrogen gas flows through the channel 5 to be supplied to the fuel electrodes 7 of the fuel cell body 10. On the other hand, outside air is supplied to the oxidizer electrodes 8 of the fuel cell body 10 since the openings 9 are provided on the inner wall surface of the penetration hole 11 formed inside the fuel cell cartridge. As a result, an electric power generating reaction occurs in the fuel cell body 10, and the electricity generated is taken out from the electrodes 2. The penetration hole penetrates an inner portion of the fuel cell cartridge from one surface of the fuel cell cartridge to the opposite surface. Even when the fuel cell cartridge is attached to the electric apparatus, utilizing the space of the penetration hole enables efficient ventilation for the oxidizer electrode 8 of the fuel cell body.

Further, the heat and moisture generated from the electric power generating reaction are not discharged into the electric apparatus having the fuel cell cartridge attached thereto, but into the penetration hole 11 from the openings 9 of the oxidizer electrodes. Then, the heat and moisture are discharged outside the electric apparatus, whereby the adverse effect on the electric apparatus due to the heat and moisture can be avoided. In particular, as in this example, when the penetration hole is provided in a straight line manner, air from outside flows with improved ease, thereby making it possible to conduct ventilation effectively.

As shown in FIG. 6, in a state where the fuel cell cartridge is attached to the electric apparatus, when the outside-air communicating port 12 is provided in the electric apparatus so as to communicate with the penetration hole opened inside the fuel cell cartridge, the penetration hole inside the fuel cell cartridge is communicated with outside air. Accordingly, intake of oxygen necessary for an electric power generating reaction and discharge of the heat and water vapor generated from the electric power generating reaction can be efficiently attained.

Moreover, as in FIG. 6, when the fuel cell cartridge and the external casing for the electric apparatus are formed such that the penetration hole 11 opened inside the fuel cell cartridge and the outside-air communicating port 12 opened in the electric apparatus are in communication with each other in a straight line manner, convection occurs as in a chimney owing to the heat generated from the electric power generating reaction of the fuel cell, thereby extremely improving the ventilation efficiency. Also the moisture will be discharged to outside efficiently in accordance with the heat convection.

As shown in FIG. 6, the outside-air communicating port 12 is provided at an upper portion of the penetration hole because the size of the fuel cell cartridge is smaller than the size of the digital camera. However, by adjusting the size of the fuel cell cartridge to the size of the digital camera, the provision of the outside-air communicating port 12 for the digital camera can be omitted.

In this example, the penetration hole 11 of the fuel cell cartridge is formed like a straight line. However, the penetration hole may not necessarily have a straight line shape as long as it penetrates the fuel cell cartridge from one surface to the other surface to have a shape allowing air to efficiently flow.

Example 2

In Example 1, the fuel cell cartridge is provided with the penetration hole for supply of air to the oxidizer electrodes of the fuel cell part and discharge of heat and moisture. However, the present invention can be embodied by forming a concave portion (groove) on a side of the external casing of the fuel cell cartridge instead of providing the penetration hole. A specific example will be described in Example 2.

Figure 7:
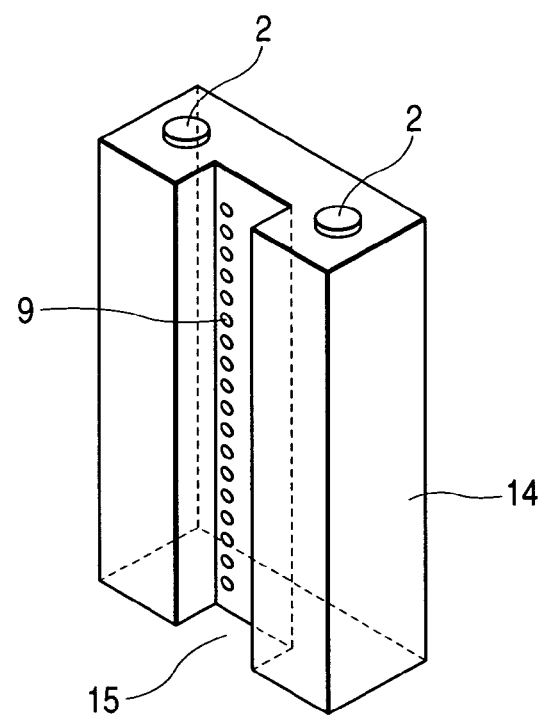
FIG. 7 is a perspective view of a fuel cell cartridge according to Example 2 of the present invention.

FIG. 7 is a perspective view schematically showing an external shape of a fuel cell cartridge according to Example 2 of the present invention.

Figure 8:
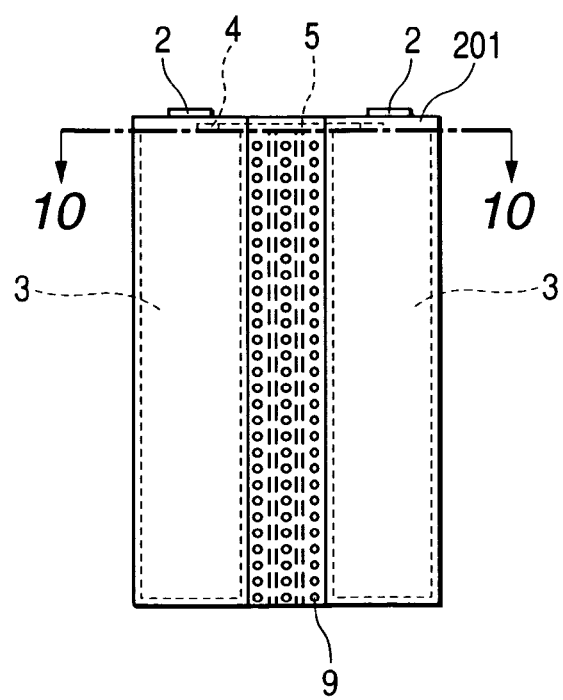
FIG. 8 is a front view of the fuel cell cartridge according to Example 2 of the present invention.
Figure 9:
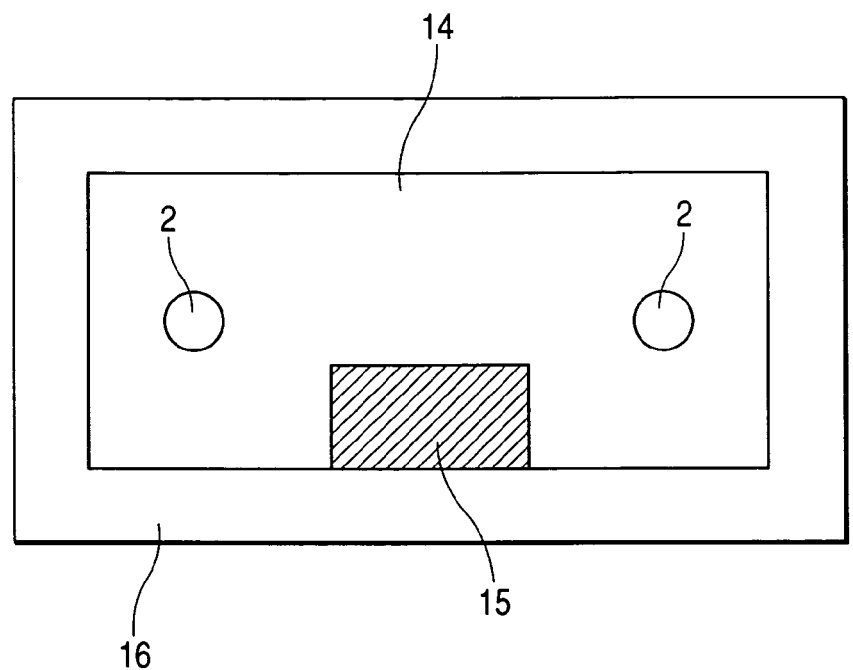
FIG. 9 is a plan view of the fuel cell cartridge according to Example 2 of the present invention.
Figure 10:
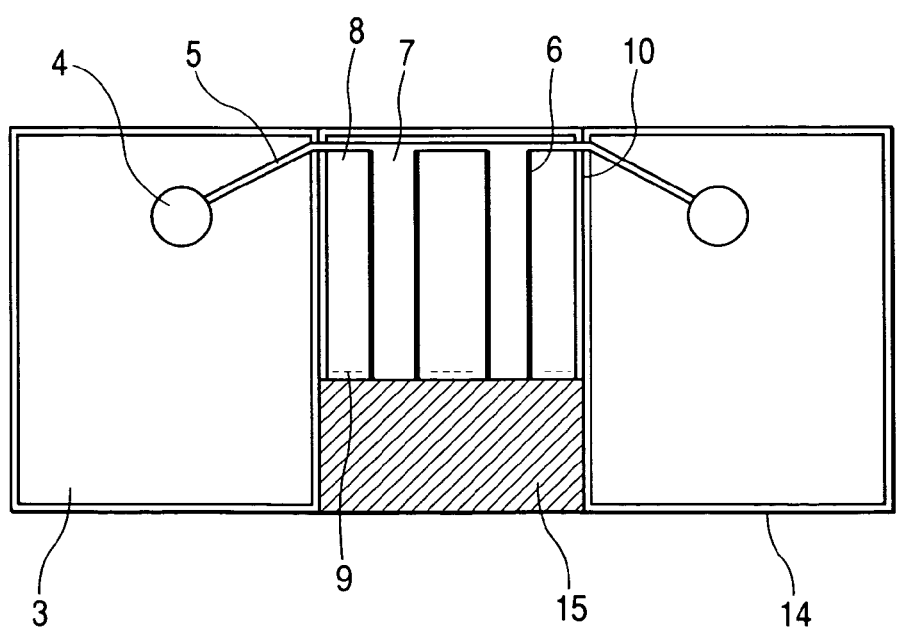
FIG. 10 is a cross sectional view, taken in the line 10-10 of FIG. 8, of the fuel cell cartridge according to Example 2 of the present invention.

In the fuel cell cartridge according to Example 2, in place of the penetration hole 11 in Example 1, an external casing 14 of the fuel cell cartridge has a concave portion (groove) 15 formed in its side. As shown in FIG. 7, the concave portion 15 is formed in a straight line manner from an upper surface to a lower surface of the fuel cell cartridge. FIG. 8 is a front view of the fuel cell cartridge according to Example 2, FIG. 9 is a plan view of the fuel cell cartridge according to Example 2, and FIG. 10 is a cross-sectional view, taken in the line 10-10 of FIG. 8, of the fuel cell cartridge. In FIGS. 7 to 10, the same constitutional elements as those in Example 1 are denoted by the same reference numerals, and a description thereto will be omitted.

In FIG. 9, reference numeral 16 denotes a fuel cell cartridge container of an electric apparatus.

Figure 15:
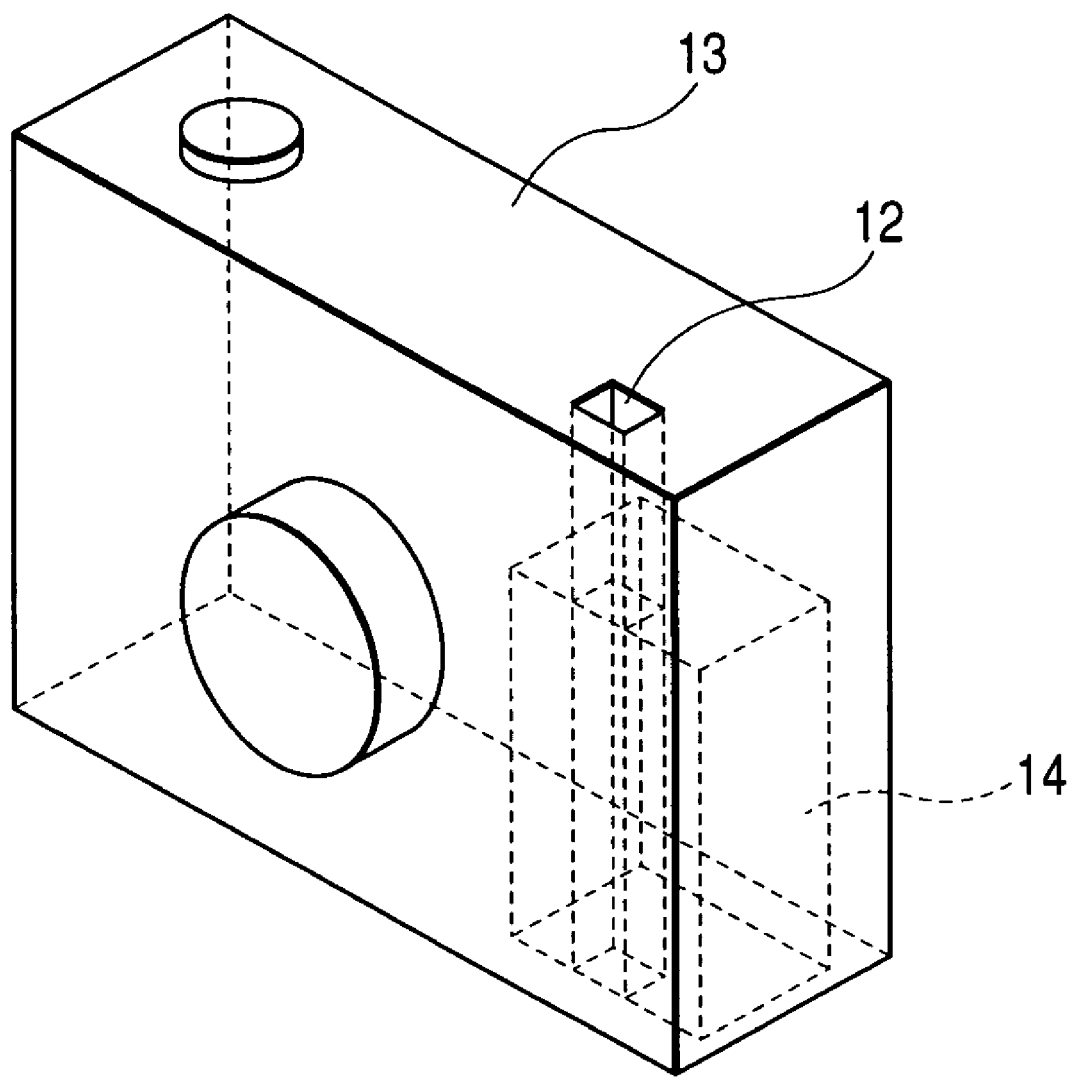
FIG. 15 is a view for explaining the state of the fuel cell cartridge according to Example 2 of the present invention being attached to an electric apparatus.

FIG. 15 is a view for explaining the state of the fuel cell cartridge according to Example 2 of the present invention being attached to the electric apparatus. As shown in FIG. 15, when the outside-air communicating port 12 is also provided to the electric apparatus so as to be in communication with the concave portion formed inside the fuel cell cartridge in a state where the fuel cell cartridge is attached to the electric apparatus, the concave portion inside the fuel cell cartridge is communicated with outside air. As a result, intake of oxygen necessary for an electric power generating reaction and discharge of the heat and water vapor generated from the electric power generating reaction can be efficiently attained.

As the fuel cell cartridge container 16 is configured such that the concave portion 15 is completely covered as shown in FIG. 9, the concave portion 15 can function similarly to the penetration hole of Example 1. As shown in FIG. 10, one fuel cell body is formed in Example 2. Although a wiring between the electrodes 2 and the fuel cell body (fuel cell part) is not shown in FIG. 10, the electrodes from the MEAs 6 of the fuel cell body (fuel cell part) 10 are connected such that voltages obtained by the electric power generation become series voltages, and then the electrodes are connected to the electrodes 2.

Operation of the fuel cell cartridge in Example 2 at the time of the electric power generation is the same as that in Example 1, and openings (ventilation ports) 9 of the oxidizer electrodes 8 are provided on the surface of the concave portion 15. Even when the fuel cell cartridge is attached to the fuel cell cartridge container 16, intake of outside air to the oxidizer electrodes from the concave portion 15 through the openings 9 can be efficiently attained. In addition, the heat and moisture generated from the electric power generating reaction can be discharged from the openings 9 to the concave portion 15, thus avoiding the adverse effect on the electric apparatus. Moreover, when the concave portion is provided in a straight line manner as in this example, air flow is facilitated and ventilation can be effectively conducted.

When the fuel cell cartridge container 16 is made of a material having water-resistant property as well as heat insulating property, the adverse effect on the electric apparatus due to the heat and moisture discharged from the openings 9 of the oxidizer electrodes to the concave portion 15 can be further suppressed.

The fuel cell cartridge according to Example 2 is advantageous in that this cartridge has a simpler configuration and is easily produced in comparison with the fuel cell cartridge according to Example 1.

Example 3

Figure 11:
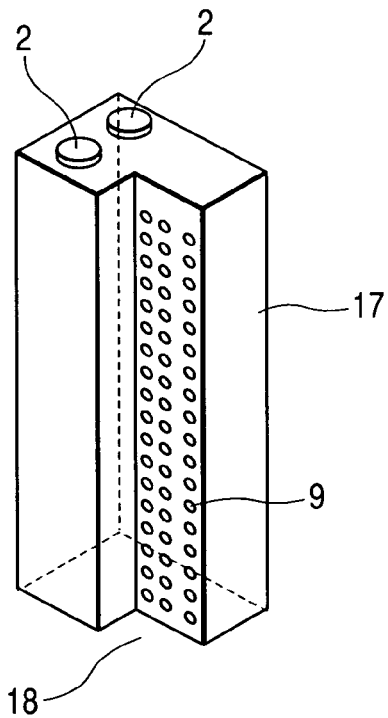
FIG. 11 is a perspective view of a fuel cell cartridge according to Example 3 of the present invention.

FIG. 11 is a perspective view schematically showing an outer appearance of a fuel cell cartridge according to Example 3 of the present invention.

Figure 12:
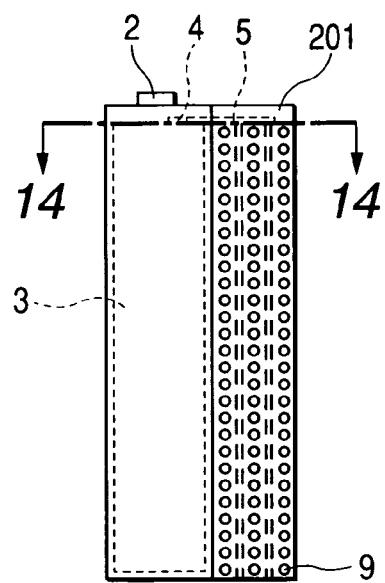
FIG. 12 is a front view of the fuel cell cartridge according to Example 3 of the present invention.
Figure 13:
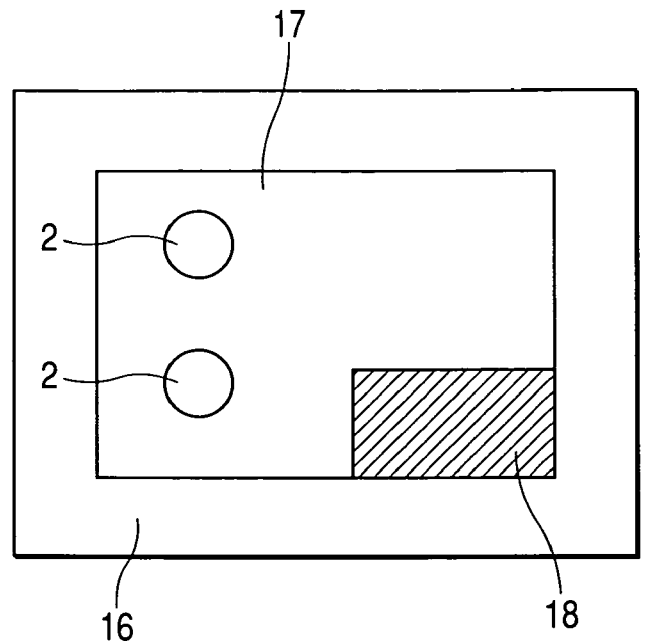
FIG. 13 is a plan view of the fuel cell cartridge according to Example 3 of the present invention.
Figure 14:
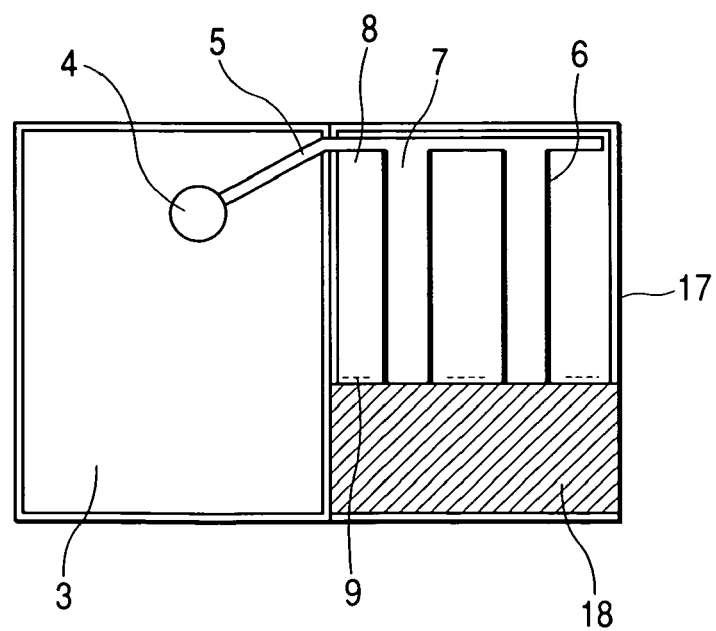
FIG. 14 is a cross sectional view, taken in the line 14-14 of FIG. 12, of the fuel cell cartridge according to Example 3 of the present invention.

In the fuel cell cartridge according to Example 3, in place of the penetration hole 11 in Example 1, an external casing 17 of the fuel cell cartridge has a concave portion (groove) 18 formed in its side. As shown in FIG. 11, the concave portion 18 is formed in a straight line manner from an upper surface to a lower surface of the fuel cell cartridge. FIG. 12 is a front view of the fuel cell cartridge according to Example 3, FIG. 13 is a plan view of the fuel cell cartridge according to Example 3, and FIG. 14 is a cross-sectional view, taken in the line 14-14 of FIG. 12, of the fuel cell cartridge. In FIGS. 11 to 14, the same constitutional elements as those in Example 1 are denoted by the same reference numerals, and a description thereto will be omitted.

Reference numeral 16 in FIG. 13 denotes a fuel cell cartridge container of an electric apparatus, which is added for explaining a state where the external casing 17 of the fuel cell cartridge is attached to the electric apparatus. As the fuel cell cartridge container 16 is configured such that the concave portion 18 is completely covered as shown in FIG. 13, the concave portion 18 can function similarly to the penetration hole of Example 1. Further, as shown in FIG. 14, one fuel cell body (fuel cell part) is formed in Example 3. Although a wiring between the electrodes 2 and the cell portion is not shown in FIG. 14, the electrodes from the MEAs 6 of the fuel cell part 10 are connected such that voltages obtained by the electric power generation become series voltages, and then the electrodes are connected to the electrodes 2.

Effects of the concave portion 18 of the fuel cell cartridge in Example 3 are the same as those of the concave portion 15 in Example 2. That is, it is possible to attain the efficient intake of air to the oxidizer electrodes from the openings 9 of the oxidizer electrode 8, which are opened for the concave portion 18. In addition, the heat and moisture generated from an electric power generating reaction can be discharged from the openings 9 to the concave portion 18, thus avoiding the adverse effect on the electric apparatus. Moreover, when the concave portion is provided in a straight line manner as in this example, air flow is facilitated and ventilation can be effectively conducted.

When the fuel cell cartridge container 16 is made of a material having water-resistant and heat insulating property, the adverse effect on the electric apparatus due to the heat and moisture discharged from the openings 9 of the oxidizer electrodes to the concave portion 18 can be further suppressed.

In each of Examples 1 to 3, a case is described as an example where hydrogen is used as the fuel for the fuel cell. The present invention is also applicable when methanol is used as the fuel.

Also, the fuel cell cartridge detachably attached to the electric apparatus has been described in each of Examples 1 to 3. However, the present invention is also applicable to a fuel cell to be fixed to an electric apparatus, similarly to Examples 1 to 3, by providing the penetration hole or the concave portion (groove) in the casing of the electric apparatus covering the fuel cell body, and by providing the electric apparatus with the openings in communication with the penetration hole or the concave portion provided in the casing of the fuel cell body.

According to the present invention, it is possible to provide the fuel cell cartridge which can more efficiently supply oxygen necessary for an electric power generating reaction to the fuel cell body and which can treat moisture and heat resulting from the electric power generating reaction without adversely affecting the electric apparatus using the fuel cell; and to provide the electric apparatus having a built-in fuel cell. For example, the present invention can be utilized for an electric power source for a potable apparatus such as a laptop personal computer or a mobile phone, and for such electric apparatuses.

This application claims priority from Japanese Patent Application No. 2003-406165 filed on Dec. 4, 2003, which is hereby incorporated by reference herein.

What is claimed is:

1. A fuel cell cartridge comprising:
    an external casing;
    a fuel cell body, which is accommodated in the external casing and which comprises at least a fuel electrode, an oxidizer electrode, and an ion conductor; and
    a fuel tank storing a fuel,
    wherein the external casing has a penetration hole in communication with the outside air,
    wherein the penetration hole penetrates the external casing from its one end to its other end opposite the one end such that the outside air can flow from the one end to the other end through the external casing along a straight line, and
    wherein an inner wall of the penetration hole is provided with at least an opening communicating with all oxidizer electrodes in the fuel cell cartridge.

2. A fuel cell cartridge according to claim 1, wherein the fuel cell cartridge is detachably attached to the electric apparatus, and an inlet of the penetration hole of the fuel cell cartridge is situated at a position corresponding to an outside-air communicating port which is provided in the electric apparatus and which is in communication with outside air.

3. A fuel cell cartridge according to claim 1, wherein the oxidizer electrode is disposed along the penetration hole while facing the opening provided in the inner wall of the penetration hole of the external casing.

4. An electric apparatus using a fuel cell cartridge according to any one of claims 1 to 3 to be mounted therein, further comprising a fuel cell cartridge container for accommodating the fuel cell cartridge, wherein the fuel cell cartridge container has an outside-air communicating port communicating with outside air, and wherein the outside-air communicating port is situated at a position corresponding to the penetration hole provided in the external casing of the fuel cell cartridge.

* * * * *